(12) United States Patent
Zhu et al.

(10) Patent No.: US 7,049,768 B1
(45) Date of Patent: May 23, 2006

(54) HIGH INTENSITY DISCHARGE LAMPS WITH ELECTRONIC CONTROL OF DIMMING

(75) Inventors: Huiling Zhu, Lexington, MA (US); Jakob Maya, Brookline, MA (US)

(73) Assignee: Matsushita Electric Works Ltd., Osaka (JP)

( * ) Notice: Subject to any disclaimer, the term of this patent is extended or adjusted under 35 U.S.C. 154(b) by 0 days.

(21) Appl. No.: 10/996,905

(22) Filed: Nov. 24, 2004

(51) Int. Cl.
*G05F 1/00* (2006.01)

(52) U.S. Cl. .................. 315/307; 315/291; 315/246; 315/247; 315/DIG. 7; 315/360; 315/149

(58) Field of Classification Search .......... 315/209 R, 315/291, 307, 247, 246, 224, 226, 149, 219, 315/308, 360, DIG. 7; 362/261–263
See application file for complete search history.

(56) References Cited

U.S. PATENT DOCUMENTS

| 4,928,038 | A | * | 5/1990 | Nerone ............... 315/209 R |
| 5,262,701 | A | * | 11/1993 | Derra et al. .............. 315/224 |
| 5,698,948 | A | | 12/1997 | Caruso |
| 5,828,178 | A | * | 10/1998 | York et al. ............... 315/151 |
| 6,242,851 | B1 | | 6/2001 | Zhu et al. |
| 6,369,518 | B1 | | 4/2002 | Kelly et al. |
| 6,441,564 | B1 | * | 8/2002 | Gu et al. ............... 315/291 |
| 6,717,364 | B1 | | 4/2004 | Zhu et al. |
| 6,958,580 | B1 | * | 10/2005 | Kamoi et al. ............ 315/291 |

* cited by examiner

*Primary Examiner*—Haissa Philogene
(74) *Attorney, Agent, or Firm*—Wolf, Greenfield & Sacks, P.C.

(57) ABSTRACT

A lighting system includes a high intensity discharge metal halide lamp having an arc discharge chamber with electrodes at each end and containing a fill of mercury, rare gas and metal halides, and a ballast circuit configured to supply pulsed electrical power to the lamp. The ballast circuit includes a controller configured to adjust the pulsed lamp power between a first relatively high power level at a relatively high duty cycle and a second relatively low power level at a relatively low duty cycle. The controller may be configured to adjust the pulsed lamp power between 90% duty cycle at rated lamp power and 10% duty cycle at 30% of the rated lamp power. The duty cycle of the pulsed lamp power may be controlled to maintain a substantially constant correlated color temperature (CCT) as the power level is adjusted.

20 Claims, 10 Drawing Sheets

HIGH INTENSITY DISCHARGE LAMPS WITH ELECTRONIC CONTROL OF DIMMING

FIELD OF THE INVENTION

This invention relates to high intensity discharge lamp systems and, more particularly to high intensity discharge metal halide lamp systems which maintain a substantially constant correlated color temperature (CCT) during dimming from 100% to 30% of rated lamp power.

BACKGROUND OF THE INVENTION

Metal halide discharge lamps, which are characterized by high efficacy and superior color rendering index (CRI), are more and more widely used for general lighting. Until now, almost all metal halide discharge lamps used for general lighting have been operated at rated lamp power. The major reason commercial metal halide discharge lamps are operated at rated lamp power without dimming is that lamp correlated color temperature (CCT) and hue, Duv, change dramatically under dimming conditions. This limitation prevents metal halide discharge lamps from being used in many installations where occupancy sensor, daylight coupling and/or constant light output features are required.

Due to the ever increasing cost of energy and increased interest in energy-conserving lighting systems, some metal halide discharge lamp systems with dimming ballasts are available on the market. Under dimmed conditions, usually dimmed to 50% of rated lamp power, the color performance of the metal halide discharge lamps with the conventional dimming ballasts deteriorates dramatically. When the lamps are dimmed, the CCT of the lamps typically increases significantly, while the hue of the light deteriorates significantly away from white light. Furthermore, for many real applications, 50% of rated lamp power is still too high for both light output level and energy consumption. Dimming of metal halide discharge lamps to even lower power levels is desired.

Under dimming conditions, metal halide arc discharge chamber wall temperatures and coldest spot temperatures are lower than the temperatures at rated power due to the power reduction. At the lower coldest spot temperature under dimming conditions, the vapor pressure of the metal halide fill in the arc discharge chamber is reduced, causing significant changes of the CCT of the lamp.

U.S. Pat. No. 6,717,364, issued Apr. 6, 2004 to Zhu et al., discloses metal halide lamps with a special chemical fill which exhibit superior dimming characteristics. The disclosed lamps have improved performance compared to conventional metal halide lamps when the lamp power is 50% or more of the rated lamp power. Upon dimming below 50% of the rated lamp power, the CCT and hue of the lamps change significantly due to the further decrease of the coldest spot temperature of the arc discharge chamber.

U.S. Pat. No. 6,242,851, issued Jun. 5, 2001 to Zhu et al., discloses metal halide lamps that have significantly better lamp performance under dimming conditions to 50% of rated lamp power. A lamp has an arc discharge chamber in a vacuum outerjacket to reduce convection heat loss from the coldest spot of the arc discharge chamber, and a metal heat shield is used on the arc discharge chamber to reduce radiation heat loss from the coldest spot during lamp operation. The disclosed lamp exhibits very good dimming performance to 50% of the rated lamp power. However, widely used high voltage starting pulses on metal halide lamps in conjunction with a vacuum jacket may make the lamps susceptible to arcing when the arc discharge chamber leaks or slow outer jacket leaks exist. The vacuum outer jacket and metal shield at the coldest spot may keep the coldest spot temperature too high at rated wattage and can accelerate corrosion of the arc discharge chamber.

U.S. Pat. No. 5,698,948, issued Dec. 16, 1997 to Caruso, discloses a discharge lamp that contains halides of Mg, Ti and one or several of the elements from the group including Sc, Y and Ln. The lamp fill also contains Mg to improve lumen maintenance. The lamp has a disadvantage of a strong green hue when dimmed to lower than the rated power, due to the relatively high vapor pressure of TlI under dimming conditions.

U.S. Pat. No. 6,369,518, issued Apr. 9, 2002 to Kelly et al., discloses high intensity discharge lamps with electronic control of color temperature and color rendering index by changing the duty cycle of the alternating current waveform on the electrodes. The waveform of each cycle is modified to energize one electrode as positive or negative for a longer time than the other electrode, thereby altering the temperature distribution within the arc tube, whereby the coldest spot and hottest spot temperature in the arc tube are changed to provide a color variable metal halide discharge lamp. The patent mentions in a general sense that color temperature can be controlled during dimming.

Disadvantages of existing metal halide discharge lamps and dimmable ballast systems are as follows. Existing systems are designed for controlling lamp power only, with no consideration of color performance under dimming conditions. When lamp power is reduced from rated wattage to 50% of the rated wattage, the CCT of the lamp increases dramatically, often more than 1,000 K due to the decrease of the coldest spot temperature of the arc discharge chamber. These changes are not acceptable for most lighting applications. When lamp power is reduced from rated wattage to 50% of rated wattage or lower, the light radiated by a metal halide discharge lamp has a color point which is far away from the black body line, leading to a nonwhite hue.

Accordingly, there is a need for high intensity discharge lamp systems with improved dimming performance.

SUMMARY OF THE INVENTION

According to a first aspect of the invention, a lighting system comprises a high intensity discharge metal halide lamp having an arc discharge chamber with electrodes at each end and containing a fill of mercury, rare gas and metal halides, and a ballast circuit configured to supply pulsed electrical power to the lamp. The ballast circuit includes a controller configured to adjust the pulsed lamp power between a first relatively high power level at a relatively high duty cycle and a second relatively low power level at a relatively low duty cycle.

The controller may be configured to adjust the pulsed lamp power between 90% duty cycle at rated lamp power and 10% duty cycle at 30% of the rated lamp power. The duty cycle of the pulsed lamp power may be controlled to maintain a substantially constant correlated color temperature as the power level is adjusted.

According to a second aspect of the invention, a method for operating a high intensity discharge lamp is provided. The method comprises supplying pulsed electrical power to the lamp, and controlling the pulsed lamp power between a first relatively high power level at a relatively high duty cycle and a second relatively low power level at a relatively low duty cycle.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
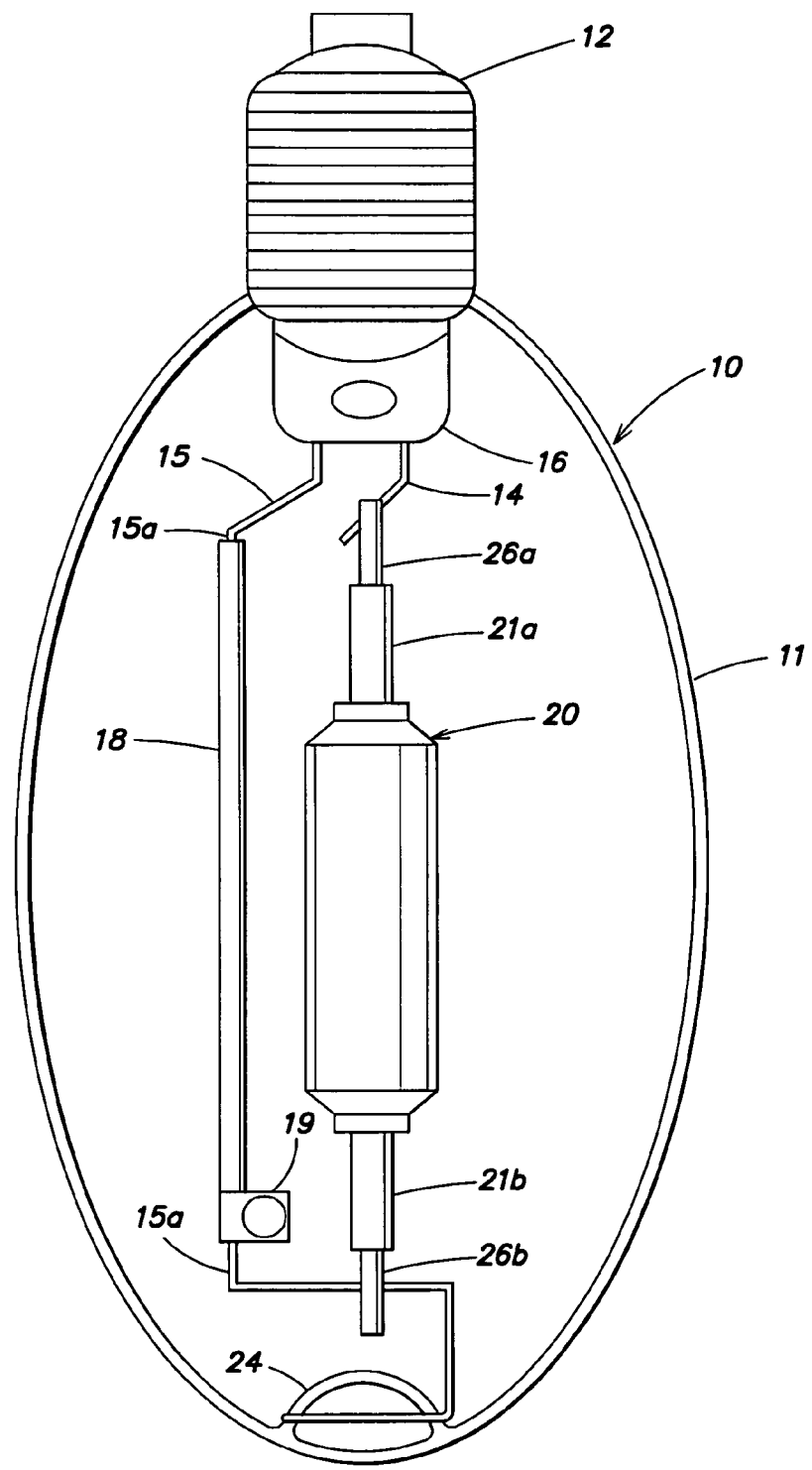
FIG. 1 is an elevation view, partly in cross section, of a high intensity discharge metal halide lamp.
Figure 2:
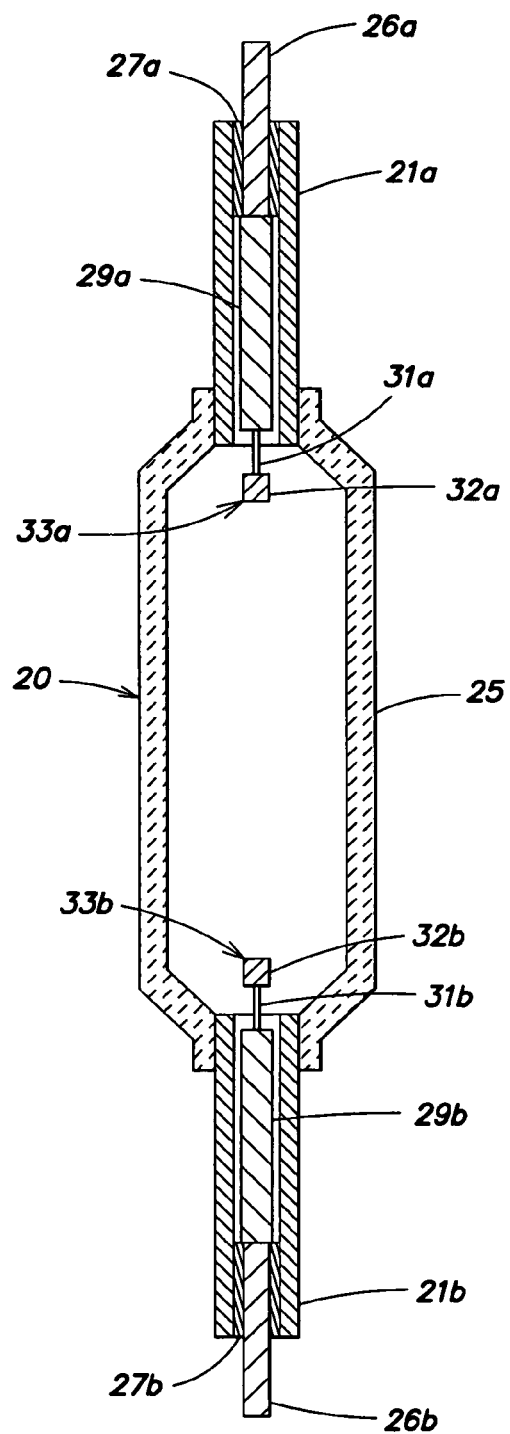
FIG. 2 is an enlarged cross-sectional view of the arc discharge chamber of FIG. 1.

A high intensity discharge metal halide lamp in accordance with an embodiment of the invention is shown in FIG. 1. An expanded cross-sectional view of the arc discharge chamber is shown in FIG. 2. A discharge lamp 10 includes a bulbous lamp envelope 11 having a conventional base 12 fitted with a standard glass flare 16. Lead-in wires 14 and 15 extend from base 12 through flare 16 to the interior of envelope 11. A harness 15a, formed of a bent wire construction, is disposed within lamp envelope 11. The harness 15a is anchored within the envelope on a dimple 24 at one end of lamp envelope 11. The harness 15a and the lead-in wire 14 support an arc discharge chamber 20. A conventional getter 19 is attached to harness 15a. The harness 15a is covered by a ceramic tube 18 to prevent production of photoelectrons from the surface of the harness. Conductive sealing members 26a and 26b supporting electrodes 33a and 33b (FIG. 2), respectively, are attached to the harness 15a and the lead-in wire 14, respectively, to provide power to the lamp and also to provide support. Sealing members 26a and 26b are disposed within and hermetically sealed to tubes 21a and 21b, respectively.

As shown in FIG. 2, arc discharge tube 20 includes a cylindrical main tube 25 having tapered ends. The main tube 25 may be made of a translucent ceramic material in which alumina is a main component. One end of tube 21a is sealed to one end of main tube 25 by shrinkage fitting. In a similar manner, one end of tube 21b is sealed to a second end of main tube 25 by shrinkage fitting.

Sealing member 26a, a first lead-through-wire 29a and a first main electrode shaft 31a are integrated and inserted in tube 21a. Specifically, one end of lead-through-wire 29a is connected with one end of sealing member 26a by welding, and the other end of lead-through-wire 29a is connected with one end of main electrode shaft 31a by welding. Then, sealing member 26a is fixed to the inner surface of tube 21a by a frit 27a such that tube 21a is sealed airtight. When sealing member 26a, first lead-through-wire 29a and first main electrode shaft 31a are disposed in the tube 21a, an end of sealing member 26a is positioned outside tube 21a.

An electrode coil 32a is integrated and mounted to the tip portion of main electrode shaft 31a by welding, so that main electrode 33a includes main electrode shaft 31a and electrode coil 32a. The lead-through-wire 29a serves as a lead-through-for positioning the main electrode 33a at a predetermined position in main tube 25. The sealing member 26a may be formed by a metal wire of niobium. For example, the diameter of sealing member 26a may be 0.9 mm, and the diameter of first main electrode shaft 31a may be 0.5 mm.

Similarly, conductive sealing member 26b, a second lead-through-wire 29b and a second main electrode shaft 31b are integrated and inserted in tube 21b. Specifically, one end of lead-through-wire 29b is connected with one end of sealing member 26b by welding, and the other end of lead-through-wire 29b is connected with one end of main electrode shaft 31b by welding. Then, sealing member 26b is fixed to the inner surface of tube 21b by a frit 27b such that tube 21b is sealed airtight. When the sealing member 26b, lead-through-wire 29b and main electrode shaft 31b are disposed in tube 21b, an end of sealing member 26b is positioned outside tube 21b.

An electrode coil 32b is integrated and mounted to the tip portion of the other end of main electrode shaft 31b by welding. Main electrode 33b includes main electrode shaft 31b and electrode coil 32b. The lead-through-wire 29b serves as a lead through part for positioning the main electrode 33b at a predetermined position in main tube 25. The sealing member 26b may be formed by a metal wire of niobium. For example, the diameter of sealing member 26b may be 0.9 mm, and the diameter of main electrode shaft 31b may be 0.5 mm.

Figure 3:
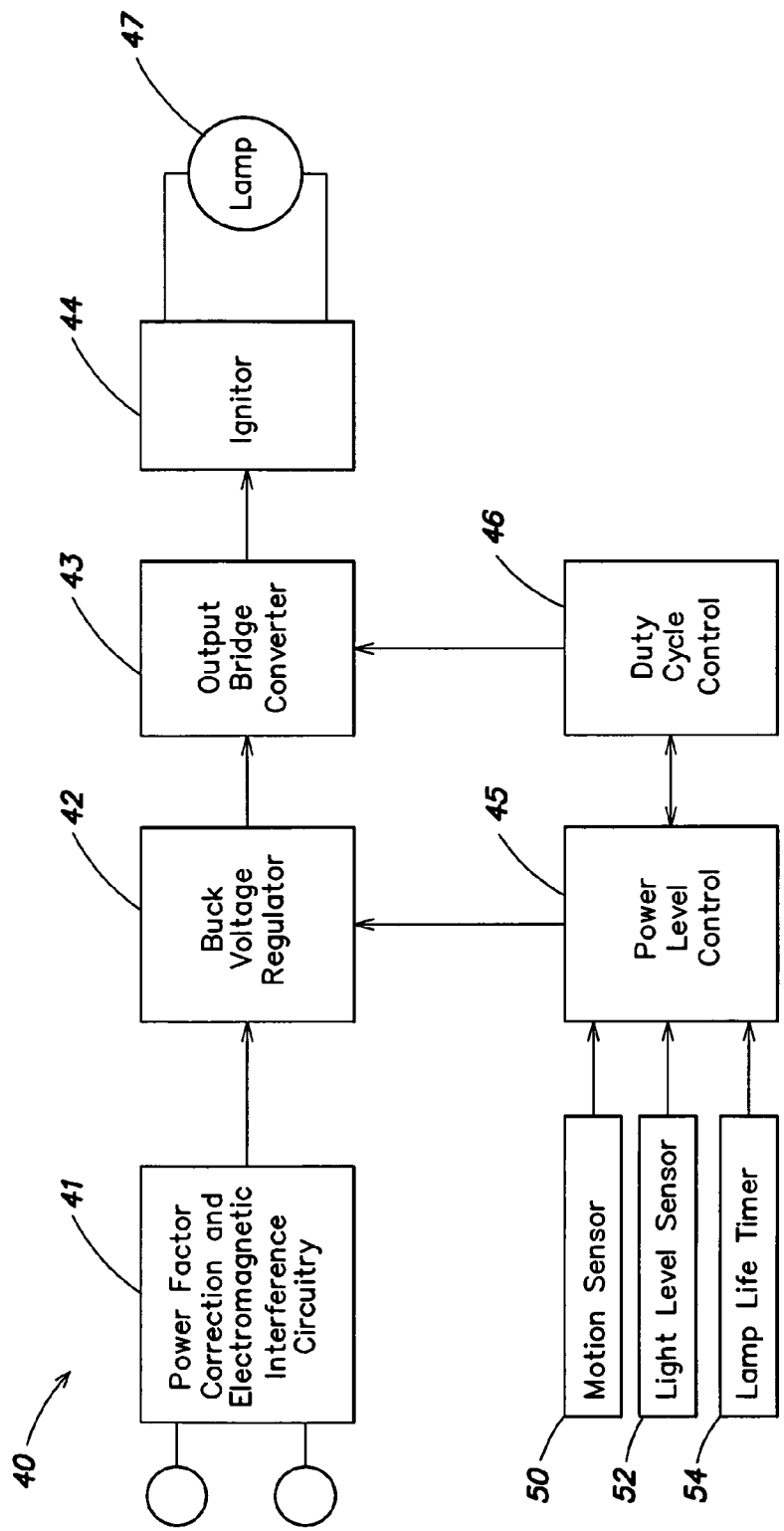
FIG. 3 is a block diagram of an electronic ballast circuit in accordance with an embodiment of the invention.

FIG. 3 is a block diagram of an electronic ballast circuit having a power level control and duty cycle control. Depending on a specific application, different sensors can be connected to the control unit of the ballast circuit. For example, a motion sensor can be used for occupancy detection, a light level sensor can be used for daylight coupling applications and/or a lamp life timer can be used for a constant light output application.

As shown in FIG. 3, electronic ballast circuit 40 includes a power factor correction and electromagnetic interference circuitry 41, a buck voltage regulator 42, an output bridge converter 43, a power level control 45, a duty cycle control 46 and an igniter 44 connected to a discharge lamp 47. The power level control 45 adjusts voltage regulator 42 to control the current supplied to lamp 47 for lamp dimming. The power level control 45 may receive inputs from a motion sensor 50, a light level sensor 52 and/or a lamp life timer 54. In further embodiments, power level control 45 may be manually controlled. Electronic ballast circuit 40 supplies to discharge lamp 47 an alternating current having variable power level for dimming and variable duty cycle as described below.

Duty cycle control 46 varies the duty cycle of the pulsed lamp power to achieve a desired performance as described below. In general, the duty cycle may be varied from 0% to 100%. However in practice, the duty cycle may be varied from about 10% to about 90% depending on power level. As described below, a duty cycle may be associated with each power level over the dimming range. Power level control 45 and duty cycle control 46 may include a microprocessor for performing the required power level and duty cycle control functions.

Figure 3A:
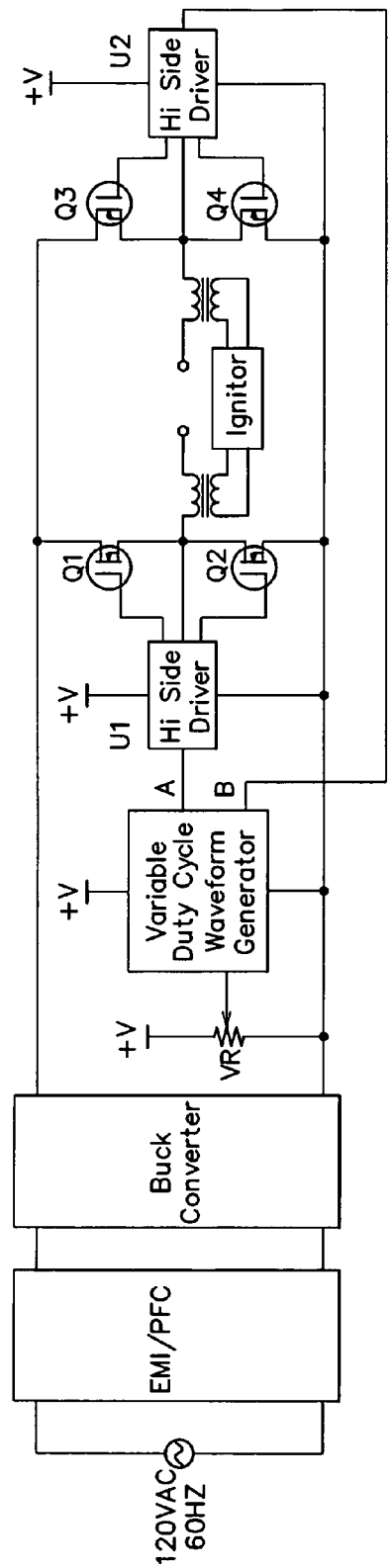
FIG. 3A is a block diagram of an electronic ballast circuit which provides a variable duty cycle.

FIG. 3A is a schematic for a ballast used to provide a variable duty cycle operation. 120V AC input power is fed into an EMI filtering and power correction circuit, then into a DC buck converter which performs the ballasting function. The output of the buck converter is then fed back into a full bridge switching circuit. A variable duty cycle waveform generator produces two variable duty cycle wave outputs A and B whose duty cycle is set between 10% and 90% by the potentiometer VR. Outputs A and B are fed into the hi-side driver circuits U1 and U2. The hi-side drivers alternately switch their respective upper and lower transistors in step with their inputs such that Q1 and Q4 are switched on for one half cycle and Q2 and Q3 are switched on for the other half cycle. Both hi-side driver circuits and the variable duty cycle waveform generator incorporate a small amount of dead time (both circuits low) in order to eliminate cross conduction of the transistors.

Figure 4:
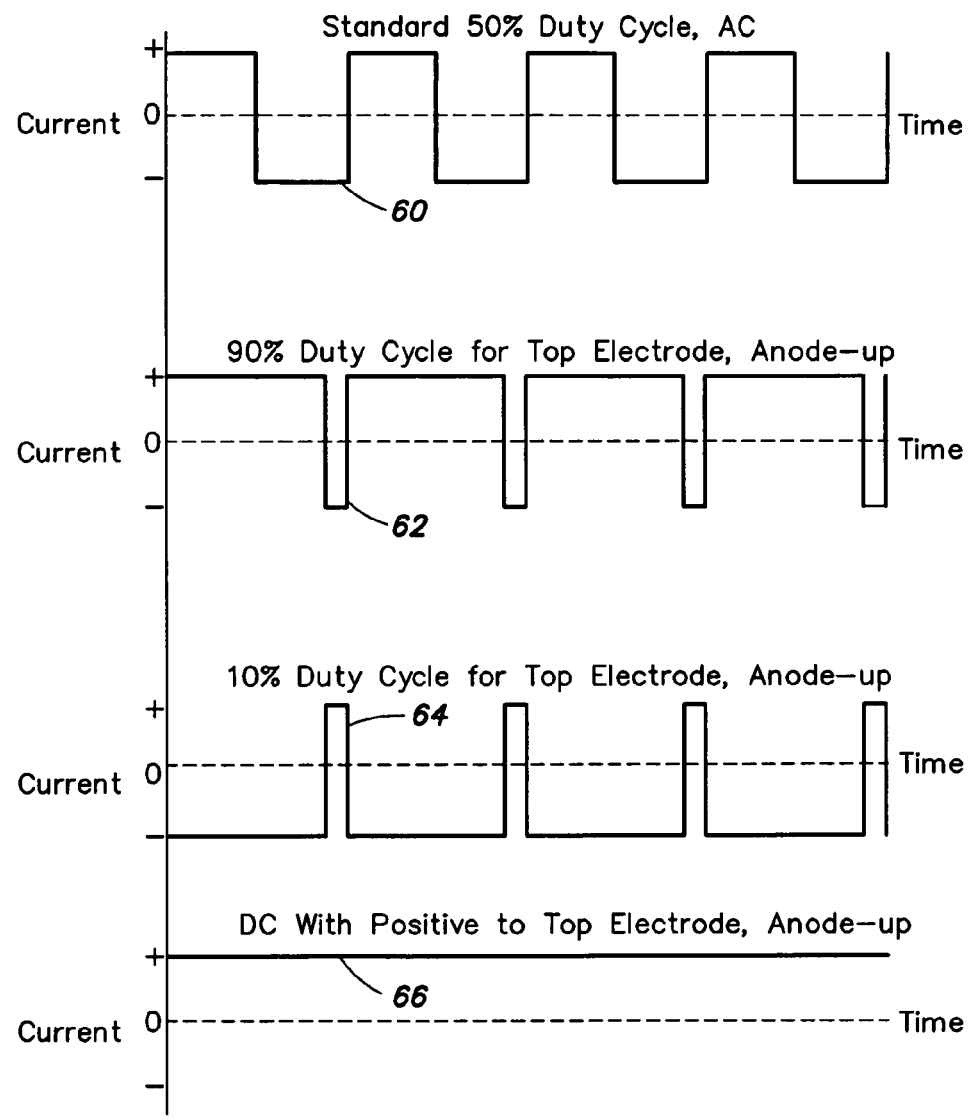
FIG. 4 illustrates current waveforms supplied by the electronic ballast circuit to the discharge lamp in accordance with embodiments of the invention.

FIG. 4 shows lamp current waveforms at different duty cycles. The frequency of the lamp current is typically in a range of 100 to 400 Hz. Waveform 60 illustrates a standard 50% duty cycle. Waveform 62 illustrates a 90% duty cycle for the top electrode of the discharge lamp, thus establishing anode up operation since the top electrode is energized 90% of the time. At 90% duty cycle for the top electrode, the time the top electrode functions as anode is longer compared to the time it serves as cathode. Waveform 64 illustrates a 10% duty cycle for the top electrode, thus establishing anode down operation since the bottom electrode is energized 90% of the time. Waveform 66 illustrates a 100% duty cycle for the top electrode, which corresponds to DC operation. In DC operation the top electrode is the anode 100% of the time.

Figure 5:
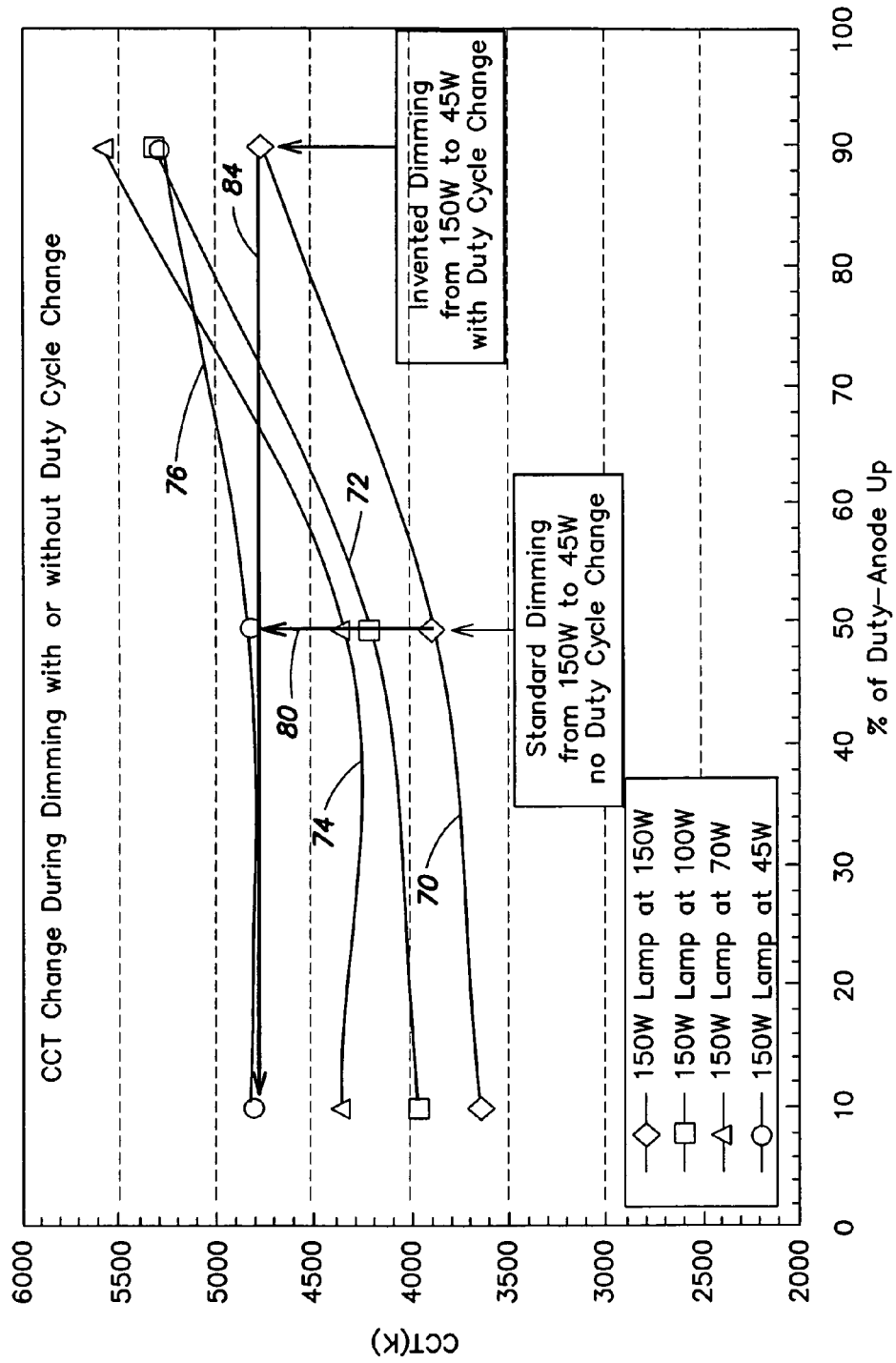
FIG. 5 is a graph of CCT as a function of duty cycle at different lamp power levels.

FIG. 5 shows the CCT as a function of duty cycle for different power levels. Curve 70 represents a 150 W metal halide discharge lamp operated at the rated power of 150 W. Curve 72 represents the 150 W lamp operated at 100W, curve 74 represents the 150 W lamp operated at 70 W, and curve 76 represents the 150 W lamp operated at 45 W. The prior art dimming operation without duty cycle control is illustrated by line 80 in FIG. 5. Specifically, the duty cycle of the applied current is maintained at 50%, and the power is decreased from 150 W to 45 W. As illustrated, the CCT exhibits a significant increase.

According to an aspect of the invention, duty cycle is controlled to provide a substantially constant CCT during dimming, as illustrated by line 84 in FIG. 5. The intersections of line 84 with curves 70, 72, 74 and 76 establish the duty cycles needed to operate along line 84. Thus, operation at 150 W (curve 70) requires a duty cycle of about 90%, operation at 100 W (curve 72) requires a duty cycle of about 75%, operation at 70 W (curve 74) requires a duty cycle of about 65% and operation at 45 W requires a duty cycle of about 10%. By controlling the duty cycle as a function of power level as described above, operation along line 84 is established and CCT is held substantially constant. It will be understood that the duty cycles and corresponding power levels given above apply to one discharge lamp type and that other duty cycles and corresponding power levels may be utilized for different discharge lamps and different applications.

FIGS. 6–9 show comparison results of a lamp operating according to an embodiment of the invention with duty cycle control and a prior art dimming operation with 50% duty cycle. The lamp was operated with a variable duty cycle electronic ballast and was measured in a two meter integrating sphere under IES accepted conditions. The data was acquired with a CCD based computerized data acquisition system. All data shown in FIGS. 5–9 were obtained with the operating position of the lamp being vertical base-up. The experiments for which the data is presented in FIGS. 5–9 were conducted using a 150 W ceramic metal halide discharge lamp manufactured by Matsushita Electric Industries, Japan.

Figure 6:
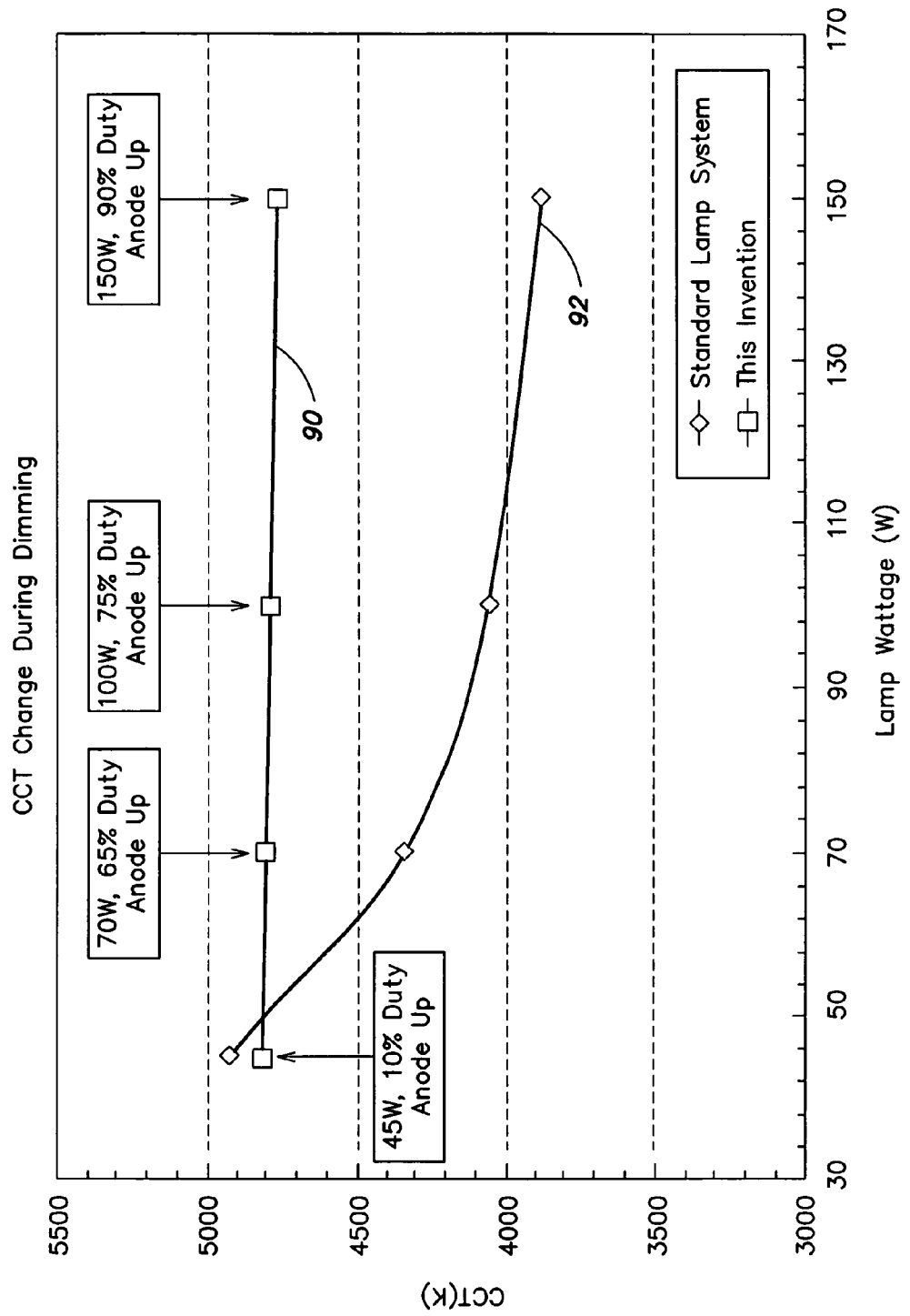
FIG. 6 is a graph of CCT as a function of lamp wattage when a discharge lamp is dimmed from 150 W (watts) to 45 W, with and without duty cycle control.

FIG. 6 shows the change in CCT when a metal halide discharge lamp is dimmed. Curve 90 represents the lamp dimmed according to the present invention with duty cycle control, and curve 92 represents the lamp dimmed according to the prior art dimming operation with constant 50% duty cycle. The CCT of the lamp operated according to the present invention had a very small change ($\Delta T=46$ K) when the lamp was dimmed from rated power to 30% of its rated power. With the same lamp in a standard dimming operation without duty cycle change, the CCT change was significant ($\Delta T=1048$ K) when the lamp was dimmed to 30% of its rated power.

Figure 7:
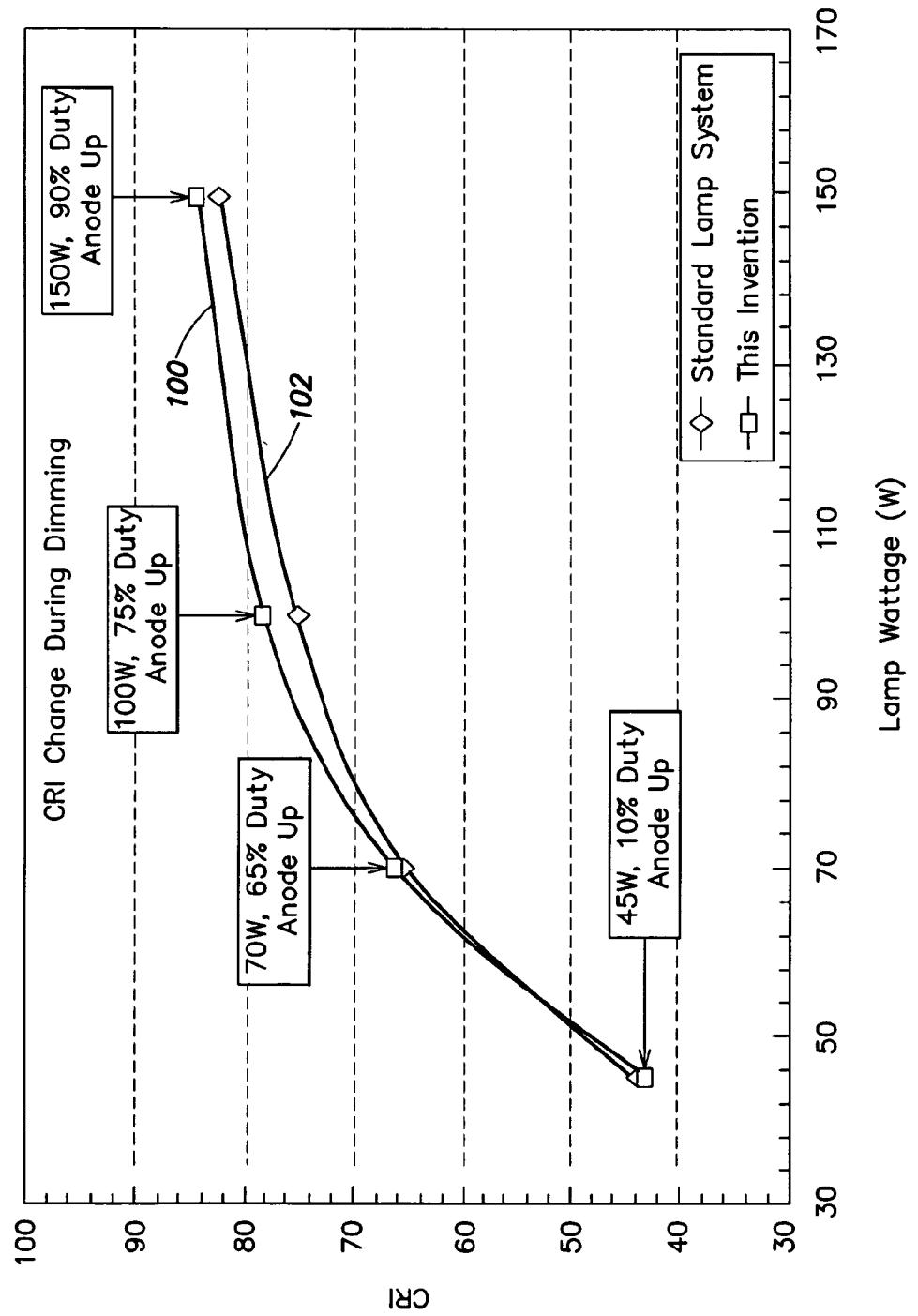
FIG. 7 is a graph of CRI as a function of lamp wattage when a discharge lamp is dimmed from 150 W to 45 W, with and without duty cycle control.

FIG. 7 shows the change in CRI (Color Rendering Index) when the discharge lamp is dimmed to 30% of its rated power. Curve 100 represents the lamp dimmed according to the present invention with duty cycle control, and curve 102 represents the lamp dimmed according to the prior art dimming operation with constant 50% duty cycle. The CRI of the lamp dimmed according to the present invention had a very similar change compared to the same lamp dimmed under the prior art dimming operation without duty cycle change.

Figure 8:
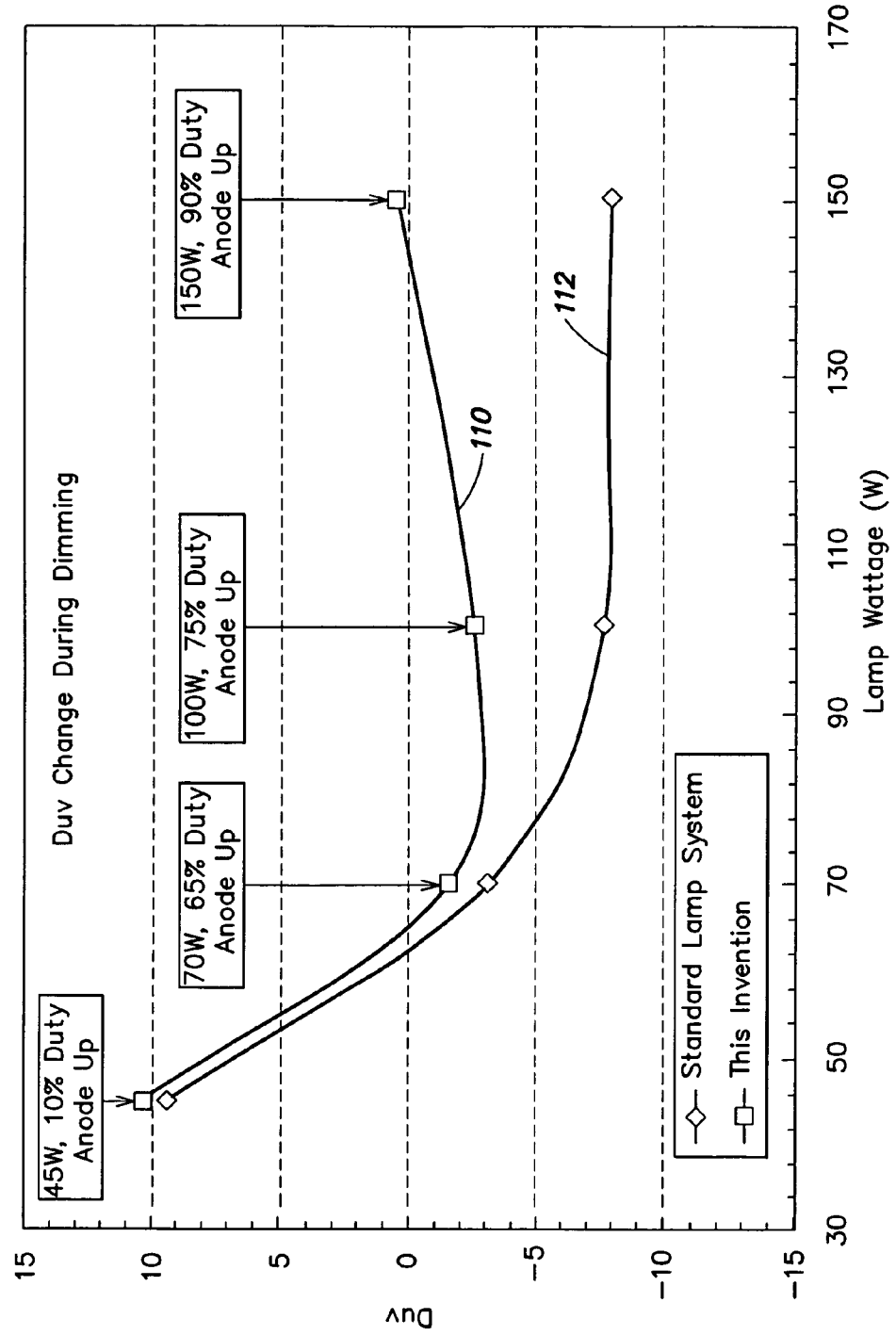
FIG. 8 is a graph of hue, Duv, as a function of lamp wattage when a discharge lamp is dimmed from 150 W to 45 W, with and without duty cycle control.

FIG. 8 shows the changes of hue (Duv) when the discharge lamp is dimmed to 30% of its rated power. Curve 110 represents the lamp dimmed according to the present invention with duty cycle control, and curve 112 represents the lamp dimmed according to the prior art dimming operation with constant 50% duty cycle. When dimmed to 30% of the rated lamp power, the lamp operated according to the present invention had a much smaller hue change ($\Delta Duv=9.8$) compared to the hue change ($\Delta Duv=17.1$) of the same lamp dimmed according to the prior art dimming operation without duty cycle change.

Figure 9:
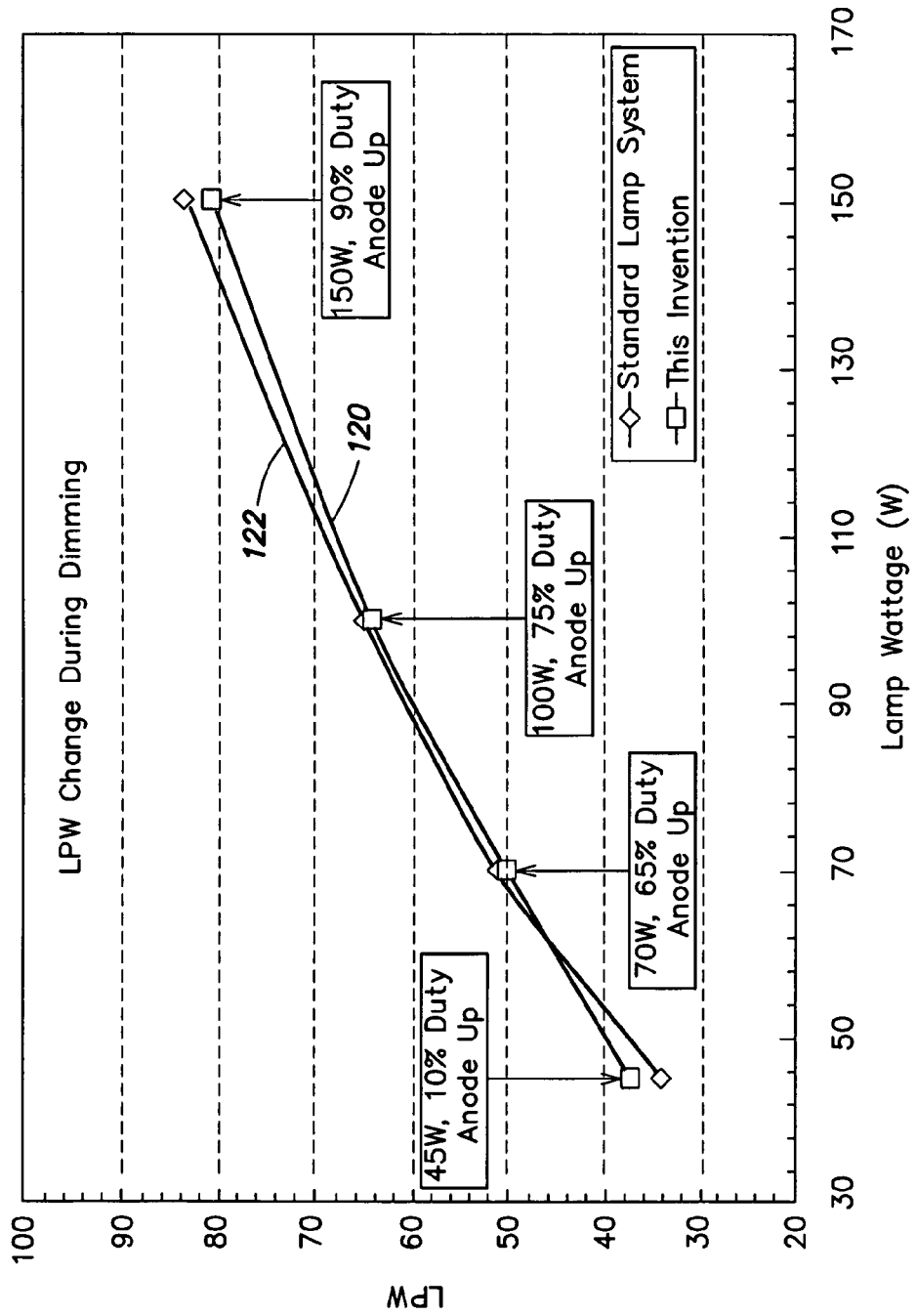
FIG. 9 is a graph of lumens per watt (LPW) when a discharge lamp is dimmed from 150 W to 45 W, with and without duty cycle control.

FIG. 9 shows the change in lamp efficacy in lumens per watt (LPW) when the discharge lamp is dimmed to 30% of its rated power. Curve 120 represents the lamp dimmed according to the present invention with duty cycle control, and curve 122 represents the lamp dimmed according to the prior art dimming process with constant 50% duty cycle. The LPW of the lamp operated according to the present invention exhibited a very similar change compared to the same lamp dimmed according to the prior art dimming operation without duty cycle control when dimmed to 30% of its rated power.

According to an aspect of the invention, a metal halide discharge lamp system is provided in which superior color performance is achieved at rated lamp power and at reduced power, such as 30% of rated power. A method and a system for modifying the CCT of lamps during dimming are provided. An electronic ballast circuit that can have its duty cycle changed simultaneously with lamp dimming is used in the lighting system. The ballast circuit imposes an alternating current waveform on the electrodes of the lamp, whereby the electrodes change from positive (anode) to negative (cathode) on each cycle of operation. By changing the duty cycle, the waveform is modified to energize one electrode as positive (anode) or negative (cathode) for a longer time than the other electrode, thereby altering the temperature distribution within the arc discharge chamber. This change compensates for the reduction of heating in the coldest spot area due to dimming, thereby resulting in a substantially constant coldest spot temperature and CCT.

According to aspects of the invention, ceramic metal halide lamps with superior dimming characteristics function in a nitrogen-filled outer jacket which makes the lamps much less susceptible to catastrophic failure during their life. The dimming range is expanded from about 50% of the rated lamp power to 30% of the rated lamp power for increased energy saving.

The coldest spot temperature in the arc discharge chamber is critical to the characteristics of the discharge between the lamp electrodes. The vapor pressure of the metal halide salts and therefore the density of the radiating atoms in the gas phase are primarily determined by the coldest spot temperature. Since the metal halide lamps contain a variety of metal halide salts, the salt composition and the coldest spot temperature essentially determine the color that is emitted by the lamp.

As compared with the lamp system of the present invention, the prior art lamp system without duty cycle variation has a much larger CCT change and deviates substantially from the black body locus when dimmed to 30% of the rated lamp power. When the lamp system with duty cycle variation according to the present invention is dimmed to about 30% of the rated lamp power, the light emitted from the system remains substantially on the black body locus and has a much smaller CCT increase.

Arc discharge chamber temperature measurement was conducted to examine the effect of lamp power duty cycle control on the arc discharge chamber wall temperatures under rated power and dimmed conditions. Temperature measurement data of one ceramic arc discharge chamber at different powers and duty cycles is summarized in Table 1 below. The arc discharge chamber operated vertically during the measurement. The maximum wall temperatures are near the center of the arc discharge chamber at different locations depending on the duty cycle and lamp power. Under AC conditions, the maximum temperature is a short distance above the center of the arc discharge chamber. Under DC conditions, the maximum wall temperature is below the center of the arc discharge chamber when the bottom electrode is the anode, and the maximum wall temperature is much above the center of the arc discharge chamber when the top electrode is the anode. The coldest spot was always at the bottom of the arc discharge chamber. When the bottom electrode serves more time as anode, the temperature of the electrode is higher as compared to 50% duty cycle. When an electrode serves as a cathode, it emits electrons that consume energy and make the electrode cooler. When an electrode serves as an anode, incoming energetic electrons heat the electrode and increase its temperature. The higher electrode temperature at the bottom of the arc discharge chamber, which is also the coldest spot of the arc discharge chamber, increases the coldest spot temperature of the arc discharge chamber.

TABLE 1

|  | 150 W | 100 W | 70 W |
|---|---|---|---|
| Max. Temp.-(50% duty anode up, AC), ° C. | 1113 | 1001 | 927 |
| Max. Temp.-(90% duty anode up), ° C. | 1127 | 1019 | 931 |
| Max. Temp.-(10% duty anode up), ° C. | 1114 | 1006 | 930 |
| Min. Temp.-(50% duty anode up, AC), ° C. | 920 | 871 | 809 |
| Min. Temp.-(90% duty, anode up), ° C. | 908 | 860 | 801 |
| Min. Temp.-(10% duty, anode up), ° C. | 1011 | 929 | 846 |

Based on the measurement data, the duty cycle adjustment described herein is effective in raising the cold spot temperature of the arc discharge chamber and is particularly effective to minimize the coldest spot temperature decrease during a dimming operation.

The lamp and ballast system described herein includes a variable duty cycle electronic ballast. By controlling the duty cycle, the electrode in the arc discharge chamber can be operated at a desired polarity for coldest spot temperature control. The coldest spot temperature change can be reduced during a dimming operation by increasing the power consumption at the electrode near the coldest spot by operating the electrode near the coldest spot a longer time as an anode. By reducing the coldest spot temperature change during dimming, the changes of CCT and Duv can be reduced. At the lowest dimming condition, higher lamp efficacy can be obtained as compared with the prior art ballast without duty cycle variation, as shown in FIG. 9. The lamp system of the present invention provides much smaller CCT change during dimming to 30% of rated lamp power, as shown in FIG. 6. Furthermore, the lamp system of the present invention provides much smaller Duv change during dimming, as shown in FIG. 8.

The lamp system of the present invention performs comparably to a prior art lamp system at rated lamp power, including lamp efficacy, CCT, CRI and Duv. When the prior art lamp is dimmed to 30% of rated lamp power without duty cycle change, the performance deteriorates substantially. What is most disturbing from the user's point of view is the change in CCT and Duv. When the same lamp is dimmed using the variable duty cycle dimming of the present invention, the CCT and Duv change are significantly smaller.

The lighting system of the present invention may have a variety of applications, including but not limited to the following. The system can provide a daylight coupling lighting system with light level sensors to achieve constant light level at any time and in any weather. The system increases and decreases lamp power according to the light level by combining the light from the sun and the electric lighting fixtures. The lighting system of the invention may operate as an occupancy sensor lighting system in low traffic areas, such as bathrooms, corridors, stairwells and parking lots, where instant light is needed when a person steps into the area. With the lamp dimmed, the lamp can reach its full light output in much shorter time when it is switched to full power. It takes much longer for the lamp to reach full light output when switched from the off mode. The lighting system of the invention can be used in an installation where continuous lighting is needed but at different levels at different times of the day to save electric energy. The lighting system of the invention can be used in an installation where a constant light output is desired during lamp life without CCT change. The lamps start their life at reduced power level and gradually increase lamp power level during lamp life to compensate for lamp efficacy deterioration, so the light level is constant without CCT changes at different lamp power levels.

Having described several embodiments and an example of the invention in detail, various modifications and improvements will readily occur to those skilled in the art. Such modifications and improvements are intended to be within the spirit and the scope of the invention. Furthermore, those skilled in the art would readily appreciate that all parameters listed herein are meant to be exemplary and that actual parameters will depend upon the specific application for which the system of the present invention is used. Accordingly, the foregoing description is by way of example only and is not intended as limiting. The invention is limited only as defined by the following claims and their equivalents.

What is claimed is:

1. A lighting system comprising:
   a high intensity discharge metal halide lamp having an arc discharge chamber with electrodes at each end and containing a fill of mercury, rare gas and metal halides; and
   a ballast circuit configured to supply pulsed electrical energy to the lamp, the ballast circuit including a controller configured to adjust lamp power between a first relatively high power level at a relatively high duty cycle and a second relatively low power level at a relatively low duty cycle.

2. A lighting system as defined in claim 1, wherein the controller is configured to adjust the pulsed lamp power between a rated power level of the lamp and 30% of the rated power level.

3. A lighting system as defined in claim 2, wherein the controller is configured to adjust the pulsed lamp power between 90% duty cycle at the rated power level and 10% duty cycle at 30% of the rated power level.

4. A lighting system as defined in claim 1, wherein the duty cycle of the pulsed lamp power is controlled to maintain a substantially constant correlated color temperature as the power level is adjusted.

5. A lighting system as defined in claim 1, wherein the controller is configured to adjust the pulsed lamp power in response to a motion sensor.

6. A lighting system as defined in claim 1, wherein the controller is configured to adjust the pulsed lamp power in response to a light level sensor.

7. A lighting system as defined in claim 1, wherein the controller is configured to adjust the pulsed lamp power in response to a lamp life timer.

8. A lighting system as defined in claim 1, wherein the controller is configured to adjust the pulsed lamp power in response to a manual dimming control.

9. A lighting system as defined in claim 1, wherein the controller is configured to adjust the pulsed lamp power over a continuous range of levels between the first and second power levels.

10. A lighting system as defined in claim 1, wherein the controller is configured to adjust the pulsed lamp power in discrete steps between the first and second power levels.

11. A method for operating a high intensity discharge metal halide lamp, comprising:
    supplying pulsed electrical power to the lamp; and
    controlling the pulsed lamp power between a first relatively high power level at a relatively high duty cycle and a second relatively low power level at a relatively low duty cycle.

12. A method as defined in claim 11, wherein controlling the pulsed lamp power comprises controlling the pulsed lamp power between the rated lamp power and 30% of the rated lamp power.

13. A method as defined in claim 12, wherein controlling the pulsed lamp power comprises controlling the pulsed lamp power between 90% duty cycle at rated lamp power and 10% duty cycle at 30% of rated lamp power.

14. A method as defined in claim 11, wherein controlling the pulsed lamp power comprises controlling the pulsed lamp power to maintain a substantially constant correlated color temperature.

15. A method as defined in claim 11, wherein controlling the pulsed lamp power includes responding to a motion sensor.

16. A method as defined in claim 11, wherein controlling the pulsed lamp power includes responding to a light level sensor.

17. A method as defined in claim 11, wherein controlling the pulsed lamp power includes responding to a lamp life timer.

18. A method as defined in claim 11, wherein controlling the pulsed lamp power includes responding to a manual dimming control.

19. A method as defined in claim 11, wherein controlling the pulsed lamp power includes adjusting the pulsed lamp power over a continuous range of power levels.

20. A method as defined in claim 11, wherein controlling the pulsed lamp power includes adjusting the pulsed lamp power over a number of discrete power levels.

* * * * *